(12) United States Patent
Ofir et al.

(10) Patent No.: US 11,144,086 B1
(45) Date of Patent: Oct. 12, 2021

(54) SYSTEMS AND METHODS FOR DYNAMIC CONFIGURATION OF A DEVICE CLOCK

(71) Applicant: Marvell Israel (M.I.S.L) Ltd., Yokne'am (IL)

(72) Inventors: Nir Ofir, Sunnyvale, CA (US); Jonatan Bar-Asher, Givataim (IL); Dror Egozi, Moreshett (IL); Erez Diamant, Petah Tikva (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 244 days.

(21) Appl. No.: 16/253,845

(22) Filed: Jan. 22, 2019

Related U.S. Application Data

(60) Provisional application No. 62/620,354, filed on Jan. 22, 2018.

(51) Int. Cl.
*G06F 1/08* (2006.01)
*G06F 13/20* (2006.01)

(52) U.S. Cl.
CPC .............. *G06F 1/08* (2013.01); *G06F 13/20* (2013.01); *G06F 2213/40* (2013.01)

(58) Field of Classification Search
CPC .............. G06F 1/32; G06F 9/44; G06F 13/20
See application file for complete search history.

(56) References Cited

U.S. PATENT DOCUMENTS

| | | | | |
|---|---|---|---|---|
| 2008/0320292 | A1* | 12/2008 | Croxford | G06F 13/1694 713/1 |
| 2009/0132837 | A1* | 5/2009 | Kumar | G06F 1/08 713/320 |
| 2011/0289179 | A1* | 11/2011 | Pekcan | H04L 47/522 709/213 |
| 2013/0147526 | A1* | 6/2013 | Kim | H03K 21/10 327/115 |
| 2019/0384348 | A1* | 12/2019 | Srinivasan | G06F 9/4893 |

* cited by examiner

*Primary Examiner* — Keshab R Pandey

(57) ABSTRACT

This disclosure describes a programmable clock configuration block disposed at the SoC system, which manages clock frequency change flow in a single clock domain on a SoC system to provide dynamic clock frequency configuration while the SoC system is in operation. The programmable clock configuration block is configured to interact with the CPU of the SoC system to configure or change parameters relating to the clock signal frequency while the CPU is in an inactive state.

20 Claims, 4 Drawing Sheets

SYSTEMS AND METHODS FOR DYNAMIC CONFIGURATION OF A DEVICE CLOCK

CROSS-REFERENCE TO RELATED APPLICATION

This disclosure claims the benefit under 35 U.S.C. § 119(e) of U.S. Provisional Patent Application No. 62/620,354, filed on Jan. 22, 2018, which is hereby incorporated by reference herein in its entirety.

FIELD OF USE

This disclosure relates to the configuration of a clock tree for an electronic device, and specifically, to mechanisms and techniques for dynamically configuring frequency changes in the clock tree of an electronic device while in operation.

BACKGROUND OF THE DISCLOSURES

A system-on-a-chip (SoC) circuit integrates circuit components into a single silicon chip or into several chip modules that are coupled together in a package, which usually includes at least one clock source, such as a crystal oscillator or a phase-locked loop (PLL), to generate clock signals that provide time context to signal processing applications of the SoC. Traditionally, the frequency of the system clock signal is pre-selected at the time when the SoC is powered up using sample-at-reset (SAR) pads on the SoC. The resulting frequencies of the clock signals configured by SAR pads are usually limited to a pre-defined set defined by the available SAR pads. For example, each SAR pad is a device pad, the output value of which is sampled when the device exits a reset mode (long after the device was powered up) by a set of register files. The sampled values are being translated by logic circuitry within the device to a "start of day" device set-up mode, which are also used to set up the clock frequency configuration parameters. The clock frequency configuration parameters are then used by the clock circuit to generate a clock signal of a particular frequency. The SAR pad usually only provides a pre-defined set of clock division factors, which are defined by the hardware structure of the SAR pads. Frequency change out of the pre-defined set of frequencies requires a device update, i.e., the SoC device needs to be powered off, and then re-powered up, for the SAR pads to be sampled when reset is done to provide a new set of clock division parameters. Thus, the traditional process of clock frequency configuration or mode change on a SoC can be labor intensive, or making compromises which affect customer requirements. In addition, using dedicated SAR pads for each clock circuit increases the cost of manufacturing the SoC system.

SUMMARY

Embodiments described herein provide A method for dynamically configuring a frequency of a system clock signal in an integrated circuit device while the integrated circuit device is in operation. A set of clock configuration parameters issued by a processor of the integrated circuit device are received, via an advanced extensible interface (AXI) bus that is uncoupled from sample-at-reset pads of the integrated circuit device, while the integrated circuit device is in operation according to a previously configured clock signal having a first frequency. In response to a signal issued by the processor of the integrated circuit device notifying that the integrated circuit device has entered an inactive state, a clock circuit is configured, via the AXI bus, to generate an updated clock signal for at least one clock domain within the integrated circuit device using the set of received clock configuration parameters. The updated clock signal has a second frequency different from the first frequency. A release command is then set to release the integrated circuit device from the inactive state thereby causing the at least one clock domain within the integrated circuit device to resume operation at the second frequency.

In some implementations, the integrated circuit device includes multiple clock domains. Thus, in response to receiving, via the AXI bus, the set of clock configuration parameters issued by the processor of the integrated circuit device, the at least one clock domain from the multiple clock domains within the integrated circuit device is identified, based on the set of clock configuration parameters. The circuit clock is configured corresponding to the at least one clock domain with the set of clock configuration parameters without affecting circuit clocks corresponding to other clock domains.

In some implementations, in response to receiving, via the AXI bus, the set of clock configuration parameters issued by the processor of the integrated circuit device, a programmable AXI block is initiated within the integrated circuit device with an active stand-by status to wait for the processor of the integrated circuit device to enter a wait-for-event status during which the processor is temporarily idling.

In some implementations, the signal issued from the processor of the integrated circuit device is obtained, notifying that the integrated circuit device has entered an inactive state. The signal indicating that the central processing unit of the integrated circuit device has entered the wait-for-event status during which the processor is temporarily idling is received, from the processor of the integrated circuit device.

In some implementations, the set of clock configuration parameters includes one or more phase-locked loop parameters are indicative of at least a pass frequency band of a filter or an oscillator frequency. The one or more phase-locked loop parameters are written, via the AXI bus, into one or more registers governing an operation of a phase-locked loop circuit in the clock circuit.

In some implementations, the set of clock configuration parameters includes a clock division parameter. A clock division parameter is written to a register in the at least one clock circuit for frequency division.

In some implementations, after configuring, via the AXI bus, a clock circuit to generate an updated clock signal for at least one clock domain within the integrated circuit device using the set of received clock configuration parameters, a pre-defined period of time is waited for a plurality of components within the at least one clock domain to receive the updated clock signal from the clock circuit prior to setting the release command.

In some implementations, a trigger signal is sent to a counter within a programmable AXI block to start counting until a counter value associated with the counter reaches a pre-defined counter value, wherein the pre-defined counter value is pre-configured for the counter. When the counter value has reached the pre-defined counter value, a completion signal which triggers the setting of the release command is obtained, from the counter.

In some implementations, a status value indicative of an active status is written, via the AXI bus, to a status register associated with the processor of the integrated circuit device.

In some implementations, after setting the release command to release the integrated circuit device from the inactive state thereby causing the at least one clock domain within the integrated circuit device to resume operation at the second frequency, a turn-off command is obtained, via the AXI bus and from the processor of the integrated circuit device. The programmable AXI block is configured while the integrated circuit device resumes operation, in which the at least one clock domain is operated according to the updated clock signal.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

In view of the inefficiency and frequency limitations in the traditional hardware-based clock configuration using SAR pads, this disclosure provides systems and methods for dynamic clock configuration controlled by the central processing unit (CPU) of a SoC system. Specifically, embodiments described herein provide a programmable clock configuration block disposed at the SoC system, which manages clock frequency change flow in a single clock domain on a SoC system to provide dynamic clock frequency configuration while the SoC system is in operation. The programmable clock configuration block is configured to interact with the CPU of the SoC system to configure or change parameters relating to the clock signal frequency while the CPU is in an inactive state. In this way, the frequency of the clock signals can be changed to a wide range of values, e.g., by configuring the clock division parameter, without interrupting operation of the SoC system. With the described dynamic clock configuration mechanism, the SoC system is able to configure or change the frequency of clock signals on-the-fly by taking advantage of the time periods when the CPU is waiting for an event, to allow new clock division parameters to be programmed into the registers of a clock generation circuit on the SoC system. Processing efficiency of the SoC system is thus improved.

Figure 1:
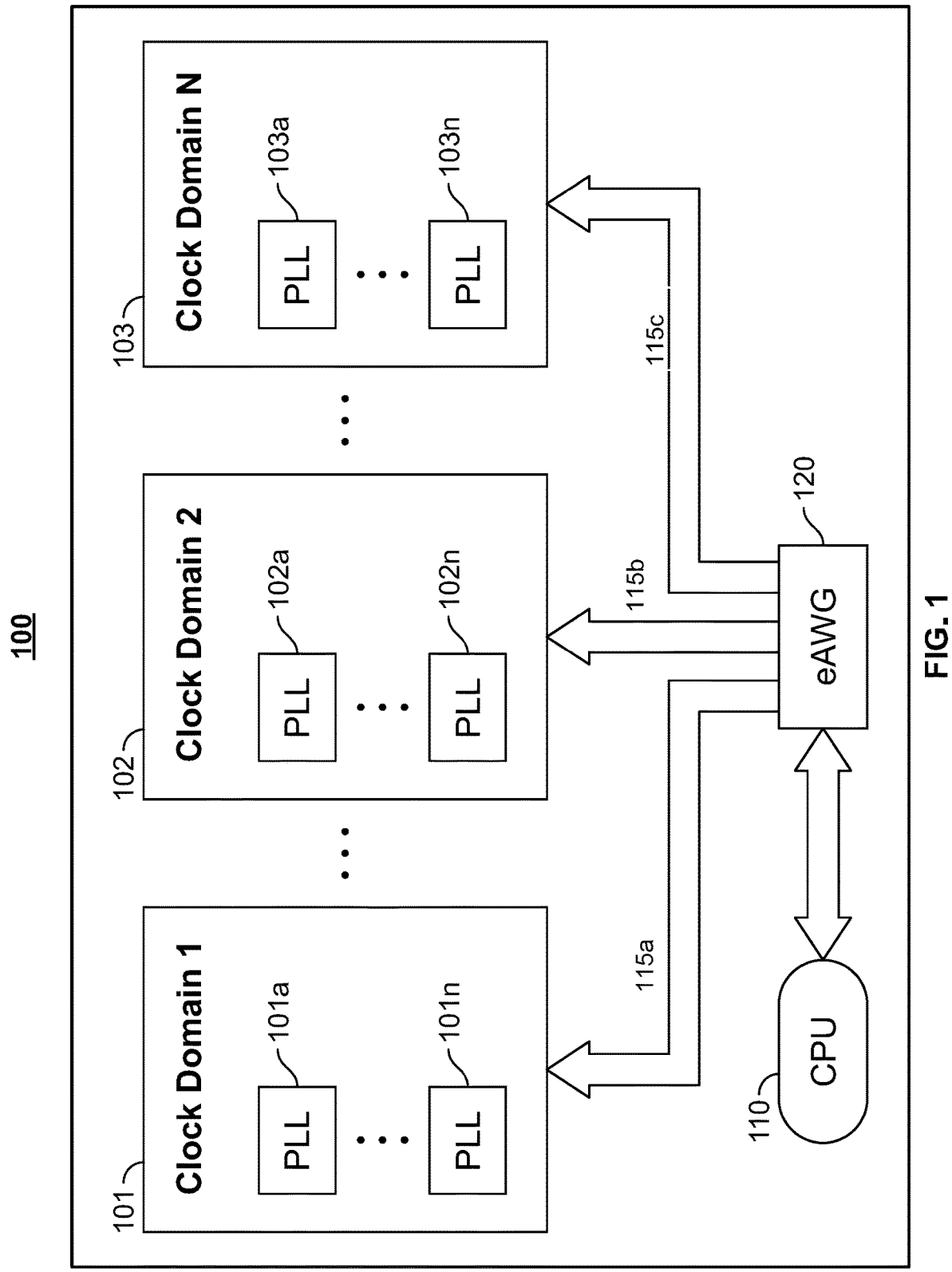
FIG. 1 provides a block diagram illustrating a programmable configuration block disposed at a SoC system for dynamic clock configuration, according to embodiments described herein.

FIG. 1 provides a block diagram illustrating a programmable configuration block disposed at a SoC system for dynamic clock configuration, according to embodiments described herein. Diagram 100 shows an integrated circuit device, such as a SoC system. The integrated circuit device 100 integrates various circuit components onto a single circuit chip, such as one or more clock domains 101, 102, 103, etc., a CPU 110, and a programmable configuration block 120 configured to dynamically change clock frequencies. In an alternative implementation, the one or more clock domains 101, 102, 103, etc. may be integrated on separate chip modules that are coupled together in the same package.

The programmable configuration block 120 is an enhanced Advanced eXtensible Interface (AXI) write generator (eAWG) that is configured to store AXI transactions information that records a complete write or read operation via an AXI bus. Specifically, the eAWG 120 is an enhanced module based on an AXI write generator, but with additional logic control unit that controls the timing of a write operation implemented by the AWG, and a counter configured to record the timing of the write operation implemented by the AWG. The eAWG 120 is configured to receive, from the CPU 110, and store AXI write operations to write clock configuration parameters to a clock circuit via an AXI bus when the eAWG 120 is started. Further details of the architecture and work flow of the eAWG 120 are provided in FIGS. 2-4.

Each clock domain 101, 102, 103, etc. may have one or more clock circuits such as PLLs 101*a-n*, 102*a-n*, 103*a-n*, respectively, which respectively generate a respective clock signal for the respective clock domain. The clock domains 101, 102 and 103 are connected to the programmable configuration block 120 via Advanced eXtensible Interface (AXI) buses 115*a*, 115*b*, 115*c*, respectively. Clock configuration parameters may be written by the programmable block 120 to the PLLs 101*a-n*, 102*a-n* or 103*a-n* via AXI buses. Specifically, when the multiple clock domains 101-103 are operated under different clock signals, the clock signal of a specific clock domain may be configured by the eAWG 120 without changing the clock frequencies of the other clock domains.

In some embodiments, when the SoC system 100 has multiple clock domains 101-103, the eAWG 120 is configured to identify, based on the set of clock configuration parameters received from the CPU 110, the target clock domain from the multiple clock domains 101-103 within the integrated circuit device 100. The eAWG 120 is then configured to configure the circuit clock corresponding to the target clock domain with the set of clock configuration parameters without affecting circuit clocks corresponding to other clock domains. In this way, after configuring the target clock circuit and when the CPU 110 resumes operation, the target clock domain is to resume operation under the newly configured clock signal, and other clock domains may resume operations under the previously configured clock signals that are unchanged.

Figure 2:
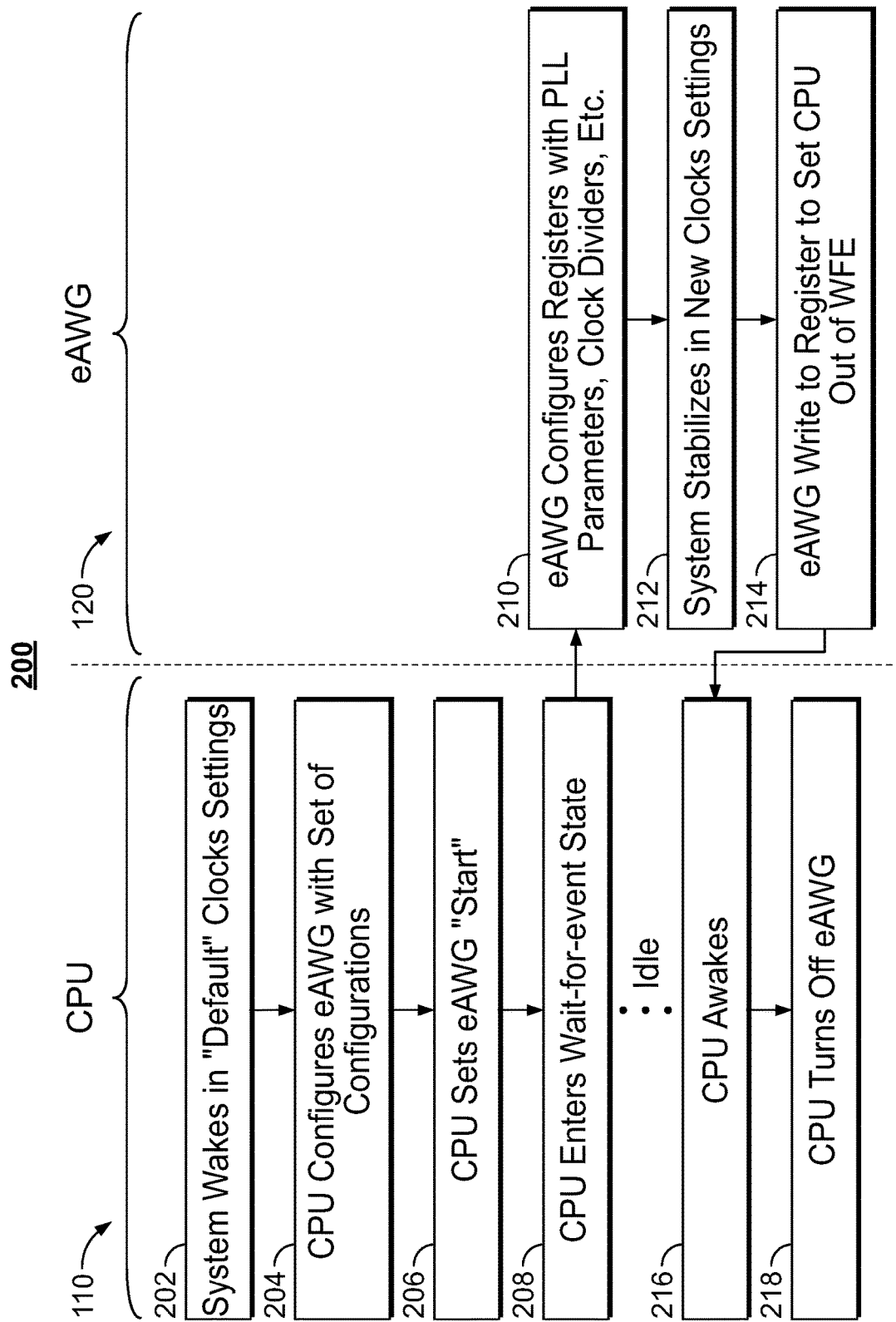
FIG. 2 provides a work flow diagram illustrating interactions between the programmable configuration block and the CPU of the SoC system shown in FIG. 1, which provide the clock change flow, according to embodiments described herein.

FIG. 2 provides a work flow diagram 200 illustrating interactions between the programmable configuration block and the CPU of the SoC system shown in FIG. 1, which provide the clock change flow, according to embodiments described herein. Diagram 200 describes an on-the-fly clock frequency change flow between the CPU 110 and the eAWG 120.

At 202, the SoC system (e.g., the integrated circuit device 100 in FIG. 1) is powered on and wakes up in a default clock setting, e.g., in operation according to a previously configured clock signal with a pre-configured frequency. At 204, the CPU 110 of the SoC system 100 configures the eAWG 120 with a set of clock configuration parameters, which are to be written to a target clock circuit via an AXI write operation. The eAWG 120 then stores, at a buffer (e.g., see 403 as further described in relation to FIG. 4) located within the eAWG 120, the set of clock configuration parameters as AXI transaction information. At 206, the CPU 110 sends a start signal to the eAWG 120 to initiate the eAWG 120. At 208, the CPU 110 then enters a wait-for-event (WFE) state. For example, when the SoC system is in operation but the CPU 110 has not received any new task from within or outside the SoC system to process for more than a pre-defined time window, the CPU 110 automatically enters a temporary idling state pending further notice.

Upon being started by the CPU 110 at 206, the eAWG 120 is configured to execute the AXI write operations to write clock configuration parameters to the target clock circuit, while the CPU 110 is idling. Specifically, at 210, the eAWG 120 is configured to write, via an AXI bus connected to the target clock circuit, PLL parameters into one or more registers governing the operation of the PLLs (e.g., any of 101*a-n*, 102*a-n* or 103*a-n*) in the target clock circuit. For example, at each clock domain, the clock signal is generated by a respective clock circuit that is configured to divide a signal generated by a voltage-controller or digital oscillator by a clock division factor, rendering a clock signal having a frequency equivalent to the oscillator frequency divided in the clock division factor. Example clock circuits can be similar to, but not limited to the clock circuits described in commonly-assigned U.S. Pat. Nos. 7,801,264 and 7,652,516, both of which are hereby expressly incorporated by reference herein in their entirety.

Different clock signals can be generated by the clock circuit with different configurations of the clock division factor. To change the frequency of the clock signal generated by the target clock circuit, the eAWG 120 is configured to configure a new clock division parameter for the target clock circuit, e.g., by sending, via the AXI bus connected to the target clock circuit, the corresponding clock division parameter to a register in the target clock circuit for frequency division. For example, the target clock circuit is then configured to obtain the newly obtained clock division parameter from the register and configure a programmable frequency divider in the PLL with the new clock division parameter. The PLL is then configured to divide the oscillator frequency by the new clock division parameter to obtain a new frequency. In this way, with the new clock configuration parameters, the target clock circuit is configured to generate an updated clock signal having a different frequency defined by the clock division parameter.

At 212, after configuring the registers with new clock configuration parameters, the SoC system 100 is configured to stabilize with the new clock setting. For example, the eAWG 120 is configured to wait for a pre-defined period of time for the target clock circuit to generate an updated clock signal with the different frequency based on the configured clock parameters, and for the circuit components within the respective clock domain to receive the updated clock signal from the target clock circuit. For example, as further described in relation to FIG. 4, the eAWG 120 includes a counter that is triggered to start counting when a new clock parameter has been sent via the AXI bus to the target clock circuit. The eAWG 120 waits until the counter reaches a pre-defined value to wake up the CPU 110, such that sufficient time has passed for the new clock signal having the new frequency is generated and sent to other components on the SoC while the counter is counting. At 214, after the pre-defined period of time, the eAWG 120 is configured to write, via an AXI bus connected to the CPU 110, a status value indicative of an active status to a status register associated with the CPU 110 to cause the CPU to exit the WFE state.

At 216, the CPU 110 is "awake" upon the WFE state being ended, and is then configured to send a turn-off signal to the eAWG 120 to turn off the eAWG 120. With the CPU 110 awake, the SoC system 100 can then resume operations with the updated clock signal of the different frequency. When a clock signal of a certain clock domain (e.g., any one of 101, 102, 103 shown in FIG. 1) is to be updated again, steps 204-218 can be repeated to dynamically configure the target clock circuit while the CPU is set to temporarily idle.

Figure 3:
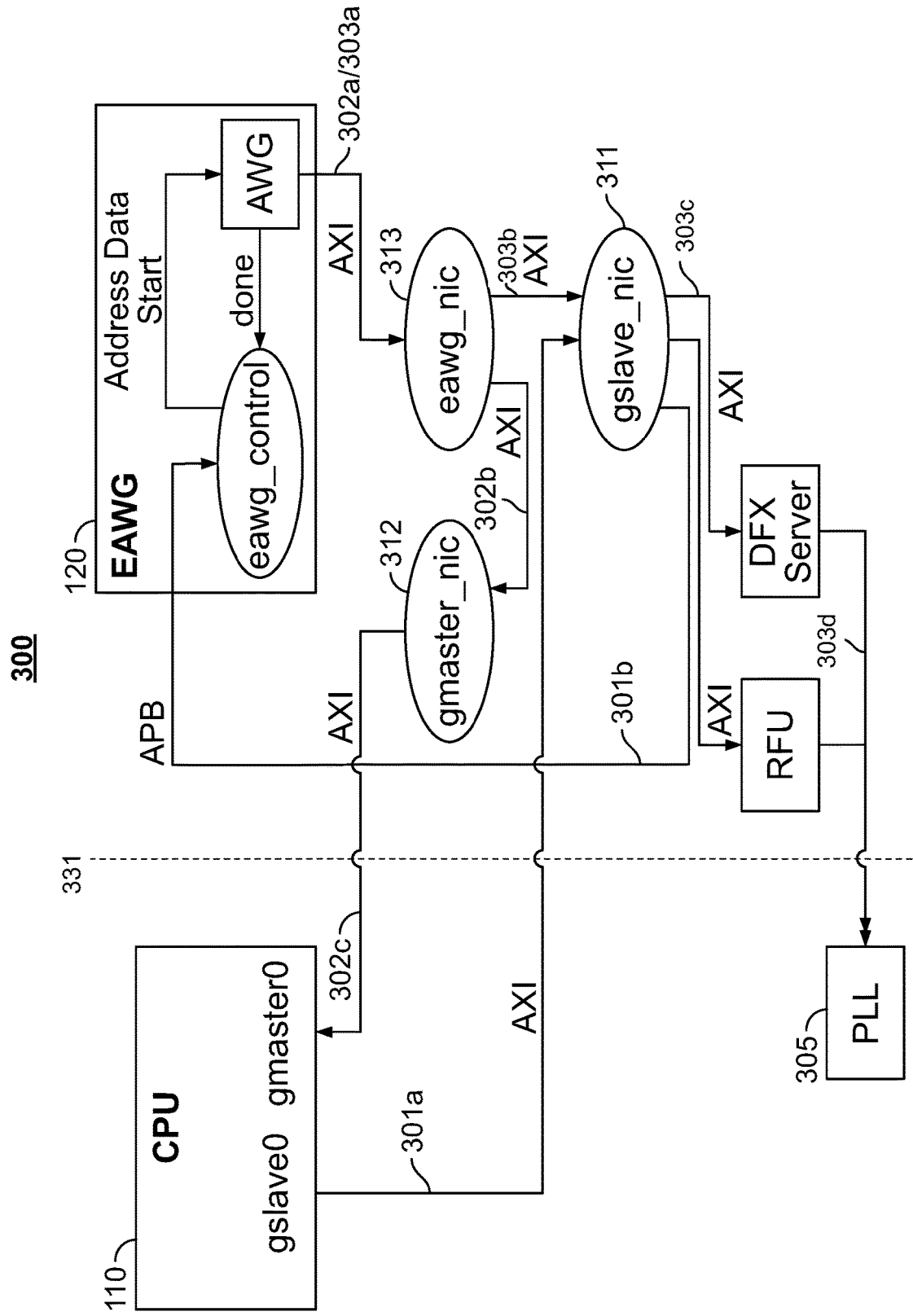
FIG. 3 provides a data flow diagram illustrating the data flows between the programmable configuration block, the clock circuit and the CPU of the SoC system that correspond to the clock change flow shown in FIG. 2, according to embodiments described herein.

FIG. 3 provides a data flow diagram illustrating the data flows between the programmable configuration block, the clock circuit and the CPU of the SoC system that correspond to the clock change flow shown in FIG. 2, according to embodiments described herein. Diagram 300 provides a detailed view of the data flows between the CPU 110, eAWG 120, and clock circuit (PLL 305). Specifically, the dashed line 331 illustrates that in some implementations, the CPU 110 and the PLL 305 (on the left side of dashed line 331), and the eAWG 120 and other logic units (on the right side of dashed line 331), are connected via AXI buses in the SoC system. In some implementations, components located to the left of dashed line 331 and components located to the right of dashed line 331 are integrated onto a single chip. Alternatively, components located to the left of dashed line 331 and components located to the right of dashed line 331 are located on separate chip modules that are coupled together in a single package.

Diagram 300 shows the data path 301*a-b* from the CPU 110 to eAWG 120, data path 302*a-c* from eAWG 120 to the CPU 110, and data path 303*a-d* from eAWG 120 to PLL 305, as detailed below.

The CPU 110 is configured to write a set of clock configuration parameters to eAWG 120 (e.g., 204 in FIG. 2) via data path 301*a-b*. For example, the set of clock configuration parameters are issued by the CPU 110 from a slave register to be written to a slave interface element 311 in the clock domain via an AXI bus 301*a* connecting the CPU 110 and the clock domain. The clock configuration parameters are then written from the slave interface element 311 to a register disposed within the eAWG 120 via an Advanced Peripheral Bus (APB) 301*b* connecting the slave interface element 311 and the eAWG 120.

When the CPU 110 is at a WFE state, the eAWG 120 is configured to configure clock configuration parameters to the clock circuit (e.g., 210 in FIG. 2) via data path 303*a-d*. For example, eAWG 120 is configured to write previously obtained clock configuration parameters to an eAWG interface element 313 via an AXI bus 303*a*. The eAWG interface element 313 in turn writes the clock configuration parameters to the slave interface element 311 via AXI bus 303*b*. The slave interface element 311 is then configured to write the clock configuration parameters to a design for manufacturing and test (DFX) server via AXI bus 303*c*, which in turn forwards the clock configuration parameters to PLL 305 via AXI bus 303*d*.

The eAWG 120 is configured to send a release command, via data path 302*a-c*, to the CPU 110 to cause the CPU 110 to exit the WFE state (e.g., 214 in FIG. 2). For example, eAWG 120 is configured to write a status value to the eAWG interface element 313 via AXI bus 302*a* (which can be the same as 303*a* described above). The eAWG interface element 313 is then configured to write the status value to a master interface element 312 via AXI bus 302*b*. The master interface element 312 is then configured to write the status value to a corresponding master register at the CPU 110 via AXI bus 302*c*, to change the status of the CPU from "WFE" to active.

Figure 4:
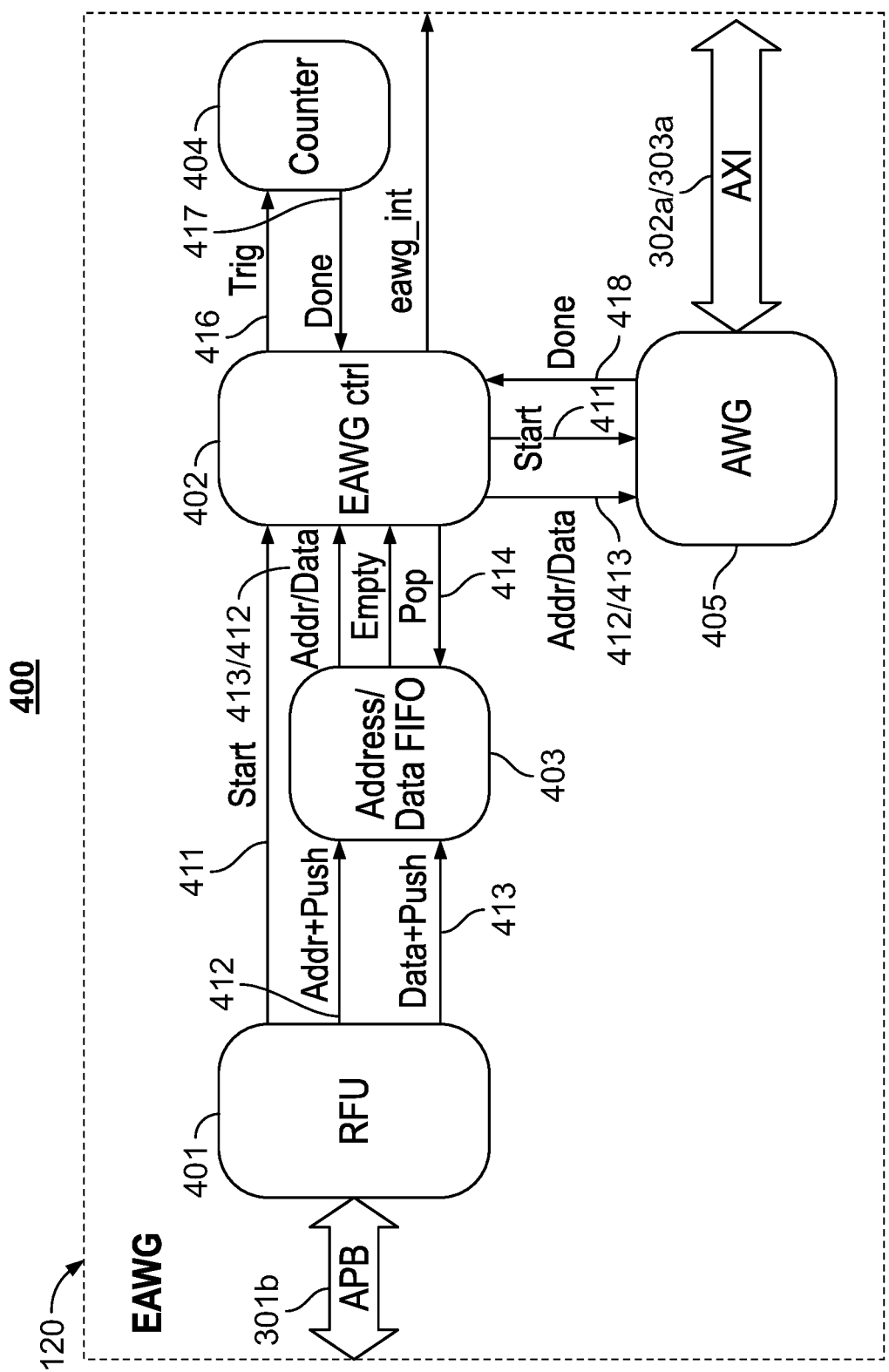
FIG. 4 provides a data flow diagram illustrating data flows inside the programmable configuration block shown in FIGS. 1-3, according to embodiments described herein.

FIG. 4 provides a data flow diagram illustrating data flows inside the programmable configuration block shown in FIGS. 1-3, according to embodiments described herein. The eAWG 120, which is configured as a programmable configuration block in one embodiment, includes a reconfigurable functional unit (RFU) 401, a first-in-first-out (FIFO) buffer, a control unit 402, a counter 404 and an AXI write generator 405.

The RFU 401 is configured to interface components outside the eAWG 120 via an APB bus 301b, and to synchronize received data parameters for a writing operation to be implemented by the eAWG 120. For example, the RFU 401 receives clock configuration parameters defining a clock division factor to be used in a frequency divider in the PLL of the target clock circuit, via an APB bus 301b from outside the eAWG 120, e.g., from the CPU 110 as described in FIG. 3. The RFU 401 is configured to generate a start signal 411 to start the eAWG control unit 402, and to push into the FIFO buffer 403 each data parameter 413 that defines a clock division factor and an address of the register in the target clock circuit to send the corresponding data parameter 412. Upon receiving the start signal, the eAWG control unit 402 is configured to send a pop command 414 to the FIFO buffer 403 to pop from head of a FIFO queue of buffered data parameters 413, and the corresponding addresses 412, that is queued in buffer 403. The eAWG control unit 402 is then configured to forward the start signal 411, data parameters 413 and addresses 412 to the AWG 405, which in turn writes the data parameters 413 via the AXI bus to an external component outside the eAWG 120, as described in FIG. 3. When the AWG 401 completes the AXI write operation, the AWG 405 is configured to issue a complete signal 418 indicating that the AXI write operation of the data parameter 413 is completed, to the eAWG control unit 402.

In some embodiments, the eAWG control unit 402 is configured to utilize the counter 404 to wait for a pre-defined period of time for clock configuration. During the pre-defined period of time, components of the clock domain, e.g., various electronic components that are operated according to a particular clock signal generated by the corresponding clock circuit in the respective clock domain, are received and stabilized with the updated clock signal generated using the newly configured clock configuration parameters. The eAWG control unit 402 is configured to send a trigger signal 416 to the counter 404, which triggers the counter 404 to start counting, according to an existing clock signal that controls the counter 404, until the counter 404 reaches a pre-defined counter value that is pre-programmed with the counter 404. When the counter value has reached the pre-defined counter value, the eAWG control unit 402 obtains, from the counter 404, a completion signal 417, which triggers the eAWG 120 to release the CPU 110 from the WFE state (e.g., at 214 in FIG. 2).

Various embodiments discussed in conjunction with FIGS. 1-4 are implemented by electronic components of one or more electronic circuits, such as but not limited to an integrated circuit, application-specific integrated circuit (ASIC), and/or the like. Various components discussed throughout this disclosure such as, but not limited to the CPU 110, eAWG 120, PLL 305, and/or the like, are configured to include a set of electronic circuit components, and communicatively operate on one or more electronic circuits.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

The subject matter of this specification has been described in terms of particular aspects, but other aspects can be implemented and are within the scope of the following claims. For example, the actions recited in the claims can be performed in a different order and still achieve desirable results. In certain implementations, multitasking and parallel processing may be advantageous. Other variations are within the scope of the following claims.

What is claimed is:

1. A method for dynamically configuring a frequency of a system clock signal in an integrated circuit device while the integrated circuit device is in operation, the method comprising:
   receiving, via an advanced extensible interface (AXI) bus that is uncoupled from sample-at-reset pads of the integrated circuit device, while the integrated circuit device is in operation according to a previously configured clock signal having a first frequency, a set of clock configuration parameters issued by a processor of the integrated circuit device, wherein the sample-at-reset pads is configured to provide pre-defined set of clock frequencies;
   in response to a signal issued by the processor of the integrated circuit device notifying that the integrated circuit device has entered an inactive state, configuring, via the AXI bus, a clock circuit to generate an updated clock signal for at least one clock domain within the integrated circuit device using the set of received clock configuration parameters regardless of the pre-defined set of clock frequencies, the updated clock signal having a second frequency different from the first frequency; and
   setting a release command to release the integrated circuit device from the inactive state thereby causing the at least one clock domain within the integrated circuit device to resume operation at the second frequency.

2. The method of claim 1, wherein the integrated circuit device includes multiple clock domains, and wherein the method further comprises:
   in response to receiving, via the AXI bus, the set of clock configuration parameters issued by the processor of the integrated circuit device:
   identifying, based on the set of clock configuration parameters, the at least one clock domain from the multiple clock domains within the integrated circuit device; and
   configuring the circuit clock corresponding to the at least one clock domain with the set of clock configuration parameters without affecting circuit clocks corresponding to other clock domains.

3. The method of claim 1, further comprising:
   in response to receiving, via the AXI bus, the set of clock configuration parameters issued by the processor of the integrated circuit device, initiating a programmable AXI module within the integrated circuit device with an active stand-by status to wait for the processor of the integrated circuit device to enter a wait-for-event status during which the processor is temporarily idling.

4. The method of claim 3, further comprising:
   obtaining the signal issued from the processor of the integrated circuit device notifying that the integrated circuit device has entered an inactive state; and receiving, from the processor of the integrated circuit device, the signal indicating that the central processing unit of the integrated circuit device has entered the wait-for-event status during which the processor is temporarily idling.

5. The method of claim 4, wherein the set of clock configuration parameters includes one or more phase-locked loop parameters indicative of at least a pass frequency band of a filter or an oscillator frequency, and wherein the configuring, via the AXI bus, a clock circuit to generate an updated clock signal for at least one clock domain within the integrated circuit device using the set of received clock configuration parameters comprises:

writing, via the AXI bus, the one or more phase-locked loop parameters into one or more registers governing an operation of a phase-locked loop circuit in the clock circuit.

6. The method of claim 1, wherein the set of clock configuration parameters includes a clock division parameter, and wherein the configuring, via the AXI bus, a clock circuit to generate an updated clock signal for at least one clock domain within the integrated circuit device using the set of received clock configuration parameters comprises:

writing a clock division parameter to a register in the at least one clock circuit for frequency division.

7. The method of claim 1, further comprising:

after configuring, via the AXI bus, a clock circuit to generate an updated clock signal for at least one clock domain within the integrated circuit device using the set of received clock configuration parameters, waiting for a pre-defined period of time for a plurality of components within the at least one clock domain to receive the updated clock signal from the clock circuit prior to setting the release command.

8. The method of claim 7, wherein the waiting for the pre-defined period of time for the plurality of components within the at least one clock domain to receive the updated clock signal from the clock circuit comprises:

sending a trigger signal to a counter within a programmable AXI module to start counting until a counter value associated with the counter reaches a pre-defined counter value, wherein the pre-defined counter value is pre-configured for the counter; and when the counter value has reached the pre-defined counter value, obtaining, from the counter, a completion signal which triggers the setting of the release command.

9. The method of claim 1, wherein the setting a release command to release the integrated circuit device from the inactive state comprises:

writing, via the AXI bus, a status value indicative of an active status to a status register associated with the processor of the integrated circuit device.

10. The method of claim 3, further comprising:

after setting the release command to release the integrated circuit device from the inactive state thereby causing the at least one clock domain within the integrated circuit device to resume operation at the second frequency:

obtaining, via the AXI bus and from the processor of the integrated circuit device, a turn-off command; and turning off the programmable AXI module while the integrated circuit device resumes operation, in which the at least one clock domain is operated according to the updated clock signal.

11. An electronic device having reconfigurable frequency clocks, comprising:

a processor configured to issue and send, via an advanced extensible interface (AXI) bus that is uncoupled from sample-at-reset pads of the electronic device and to a programmable AXI module, a set of clock configuration parameters, while the electronic device is in operation according to a previously configured clock signal having a first frequency;

the programmable AXI module configured to:

in response to a signal issued by the processor notifying that the electronic device has entered an inactive state, configure, via the AXI bus, a clock circuit to generate an updated clock signal for at least one clock domain within the electronic device using the set of received clock configuration parameters, the updated clock signal having a second frequency different from the first frequency, and set a release command to release the electronic device from the inactive state thereby causing the at least one clock domain within the integrated circuit device to resume operation at the second frequency.

12. The electronic device of claim 11, further comprising:

one or more clock domains, and wherein the programmable AXI module is further configured to:

in response to receiving, via the AXI bus, the set of clock configuration parameters issued by the processor of the integrated circuit device:

identify, based on the set of clock configuration parameters, the at least one clock domain from the multiple clock domains within the integrated circuit device; and configure the circuit clock corresponding to the at least one clock domain with the set of clock configuration parameters without affecting circuit clocks corresponding to other clock domains.

13. The electronic device of claim 11, wherein the programmable AXI module is further configured to:

in response to receiving, via the AXI bus, the set of clock configuration parameters issued by the processor of the integrated circuit device, initiate with an active standby status to wait for the processor to enter a wait-for-event status during which the processor is temporarily idling.

14. The electronic device of claim 13, wherein the processor is further configured to issue and send, to the programmable AXI module via the AXI bus the signal indicating that the processor has entered the wait-for-event status during which the processor is temporarily idling.

15. The electronic device of claim 14, wherein the set of clock configuration parameters includes one or more phase-locked loop parameters indicative of at least a pass frequency band of a filter or an oscillator frequency, and wherein the programmable AXI module is configured to write, via the AXI bus, the one or more phase-locked loop parameters into one or more registers governing an operation of a phase-locked loop circuit in the clock circuit.

16. The electronic device of claim 11, wherein the set of clock configuration parameters includes a clock division parameter, and wherein the programmable AXI module is configured to write a clock division parameter to a register in the at least one clock circuit for frequency division.

17. The electronic device of claim 11, wherein the programmable AXI module is further configured to:
   after configuring, via the AXI bus, a clock circuit to generate an updated clock signal for at least one clock domain within the electronic device using the set of received clock configuration parameters, wait for a pre-defined period of time for a plurality of components within the at least one clock domain to receive the updated clock signal from the clock circuit prior to setting the release command.

18. The electronic device of claim 17, wherein the programmable AXI module is further configured to wait for the pre-defined period of time for the plurality of components within the at least one clock domain to receive the updated clock signal from the clock circuit by:
   sending a trigger signal to a counter within a programmable AXI module to start counting until a counter value associated with the counter reaches a pre-defined counter value, wherein the pre-defined counter value is pre-configured for the counter; and
   when the counter value has reached the pre-defined counter value, obtaining, from the counter, a completion signal which triggers the setting of the release command.

19. The electronic device of claim 11, wherein the programmable AXI module is configured to release the integrated circuit device from the inactive state by:
   writing, via the AXI bus, a status value indicative of an active status to a status register associated with the processor of the integrated circuit device.

20. The electronic device of claim 13, wherein the programmable AXI module is configured to:
   after setting the release command to release the integrated circuit device from the inactive state thereby causing the at least one clock domain within the integrated circuit device to resume operation at the second frequency:
      obtain, via the AXI bus and from the processor, a turn-off command; and
      turn off the programmable AXI module while the electronic device resumes operation, in which the at least one clock domain is operated according to the updated clock signal.

* * * * *